(12) United States Patent
Fugel et al.

(10) Patent No.: US 7,189,183 B2
(45) Date of Patent: Mar. 13, 2007

(54) STOP DISK OF A PLANETARY GEAR

(75) Inventors: Wolfgang Fugel, Nuremberg (DE); Alexander Reimchen, Furth (DE)

(73) Assignee: INA Schaeffler KG, Herzogenaurach (DE)

( * ) Notice: Subject to any disclaimer, the term of this patent is extended or adjusted under 35 U.S.C. 154(b) by 139 days.

(21) Appl. No.: 10/502,310

(22) PCT Filed: Dec. 18, 2002

(86) PCT No.: PCT/EP02/14432

§ 371 (c)(1),
(2), (4) Date: Jul. 22, 2004

(87) PCT Pub. No.: WO03/064893

PCT Pub. Date: Aug. 7, 2003

(65) Prior Publication Data

US 2005/0143215 A1   Jun. 30, 2005

(30) Foreign Application Priority Data

Jan. 29, 2002   (DE) ................ 102 03 265

(51) Int. Cl.
*F16H 57/08* (2006.01)
(52) U.S. Cl. .............. 475/331; 475/159; 475/348
(58) Field of Classification Search .......... 475/331, 475/348, 159; 384/564; 192/113.32
See application file for complete search history.

(56) References Cited

U.S. PATENT DOCUMENTS

| | | | | |
|---|---|---|---|---|
| 4,480,492 A | * | 11/1984 | Fujioka et al. ............ 74/467 |
| 5,302,160 A | * | 4/1994 | Fujioka ................ 475/348 |
| 5,480,362 A | * | 1/1996 | Tanaka et al. ............ 475/346 |
| 5,489,255 A | * | 2/1996 | Hinckley et al. .......... 384/620 |
| 5,702,320 A | * | 12/1997 | Brassai et al. ............ 475/159 |
| 5,795,258 A | * | 8/1998 | Faass et al. .............. 475/348 |
| 5,928,105 A | * | 7/1999 | Taha et al. .............. 475/331 |
| 6,135,910 A | | 10/2000 | Urmaza |
| 2004/0023749 A1 | * | 2/2004 | Zelikov et al. ............ 475/331 |

FOREIGN PATENT DOCUMENTS

| | | | |
|---|---|---|---|
| DE | 3502076 C | * | 4/1986 |
| DE | 40 29 373 A1 | | 3/1992 |
| DE | 44 18 693 C1 | | 5/1994 |
| DE | 198 04 734 A1 | | 8/1998 |
| DE | 199 02 565 A1 | | 7/2000 |

* cited by examiner

*Primary Examiner*—David D. Le
(74) *Attorney, Agent, or Firm*—Charles A. Muserlian

(57) ABSTRACT

Stop disks (9, 12) that on both sides delimit planet wheels (6) and that are provided on at least two evenly spaced-apart peripheral positions with inner axial passages (9.2, 12.2) that are linked with their respective location bores (9.1, 12.2) via respective constrictions (9.2.1, 12.2.1) and between the inner axial passages (9.2, 12.2), outer axial passages 99.3, 12.3) are disposed off-set outward in the radial direction, and the inner axial passages (9.2, 12.2), when looked at in the radial direction, are disposed in the area of the rolling bodies (11.1) and the outer axial passages (0.3, 12.3) cover at least a part of the front of the planet wheels (6).

7 Claims, 5 Drawing Sheets

STOP DISK OF A PLANETARY GEAR

This application is a national stage application of PCT/EP02/14432 filed Dec. 18, 2002.

FIELD OF THE INVENTION

The invention concerns a stop washer for planet gears of a planetary transmission, which stop washer is arranged with its reception bore on a planet gear axle fixed in a planet gear carrier and delimits planet gears on both sides, said planet gears being mounted through a bearing arrangement for rotation on the planet gear axles, a supply of lubricant to the bearing arrangement being assured by an axial and, branching off therefrom, a radial lubricant passage bore of the planet gear axle and by axial openings of the stop washer.

BACKGROUND OF THE INVENTION

Stop washers of the pre-cited type with the most different of configurations are already known. They serve as an axial stop for the planet gear and protect the unhardened planet gear carrier as well as the planet gear from wear. The planet gear runs with a flat end face against a likewise flat stop surface of the stop washer. The planet gear comprises a through-bore with which it is mounted with the help of a bearing for rotation on the planet gear axle. This bearing can be constituted, for example, by a needle roller crown ring or even by a full complement needle roller set. Depending on the type of bearing, therefore, either the bearing cage or the ends of the bearing needles run on the stop washers. The stop washers are generally punched out of sheet metal. The surface of the stop washers is either ground or left in as-rolled state, or coated. The choice of the material of the washers and their surface quality and hardness depends essentially on the friction conditions prevailing.

Very often, however, the lubrication conditions at the points of contact between the stop washers and the end faces of the planet gears are unsatisfactory. In this case, bronze washers are also used as stop washers. Now and then, even two stop washers of different materials are inserted next to each other or multi-layer stop washers, for instance, plated sheet metal washers combining steel and bronze are used. This arrangement takes into account the different contact and friction conditions between the planet gear and the stop washer and between the stop washer and the planet gear carrier.

A positive influence is also exerted on the lubricant circulation within the planetary transmission and particularly at the bearing arrangement for the planet gear by an appropriate configuration of the stop washers. The lubricant circulation in the bearing arrangement of the planet gear and the lubrication of the stop surfaces of the stop washers in the region of contact with the planet gear is achieved by a purposed provision of oil grooves in the surface of the stop washers or also with axial openings.

A stop washer of this type is known, for example, from DE 35 02 076 C1. This stop washer has two flat end faces configured as stop surfaces and comprises an angular opening through which lubricant is conveyed to the bearing. Another stop washer known from DE 198 04 734 A1 is configured as a flat steel ring whose end faces are embossed and whose reception bore comprises openings. Stop washers of the pre-cited type are also disclosed in DE 44 18 693 C1.

A drawback of these stop washers is that when the planet gear runs axially against the stop washer under unfavorable conditions, the lubricant film can be torn off or interrupted at the points of contact. This results in deficient lubrication and premature wear at the points of contact and, in the extreme case, in a failure of the entire planetary transmission.

SUMMARY OF THE INVENTION

The object of the invention is to provide a stop washer for use in a planetary transmission which prevents the lubricant film at the points of contact between the end face of the planet gear and the stop surface of the stop washer from being interrupted or cut off. In addition, it should be possible to manufacture the stop washer in a simple and economic manner.

The invention achieves this object wherein a stop washer (9, 12) for planet gears of a planetary transmission, which stop washer (9, 12) is arranged with a reception bore (9.1, 12.1) on a planet gear axle (10) fixed in a planet gear carrier (1) and delimits planet gears (6) on both axial directions, said planet gears (6) being mounted through a rolling bearing arrangement (11) for rotation on the planet gear axles (10), a supply of lubricant to the bearing arrangement (11) being provided by an axial lubricant bore (10.1) and, branching off therefrom, a radial lubricant passage bore (10.2) of the planet gear axle (10) and by axial openings of the stop washer (9, 12) wherein the inner axial openings that communicate through a constriction with the reception bore of the stop washer are arranged at at least two equally spaced peripheral points of the stop washer, and outer axial openings are arranged offset radially outwards between the inner axial openings and, as viewed in radial direction, the inner axial openings are situated in the region of the rolling elements of the bearing arrangement, while the outer axial openings overlap at least a part of the end face of the planet gears. It is also within the scope of the invention to arrange the inner and the outer axial openings in successive order in radial direction or in overlapping relationship to one another.

The lubricant at first penetrates through the axial and the radial lubricant passage bores of the planet gear axle into the raceway region of the rolling bearing arrangement of the planet gears. From there it reaches the inner axial openings of the stop washer which at the same time act as lubricant reservoirs. It is assured in this way that the contact surfaces between the end faces of the rolling elements, or of the bearing cage, and the stop washer are always provided with a lubricant film. Through a gap existing between the stop washer and the planet gear and/or between the stop washer and the planet gear carrier, the lubricant also reaches the outer axial openings which likewise act as lubricant reservoirs. In this way, the contact surfaces between the end face of the planet gear and the stop washer and between the stop washer and the planet gear carrier are likewise provided with a friction-reducing lubricant film under all conditions of operation. This inventive configuration of the stop washer assures a controlled lubricant flow through the outer axial openings at all points of contact of the partners concerned. A deficient lubrication is practically excluded due to the lubricant storage action of the inner and the outer axial openings. Furthermore, the axial openings also act as an at least temporary abode for any scuffing chips from the bearing arrangement.

The peripheral dimension of the outer axial openings diminishes in radially outward direction. Through this configuration, for example in the form of a triangle, a higher pressure build-up in the lubricant is realized which, in its turn, effects a separation of the friction partners in axial direction and thus, a reduction of friction.

Following another feature of the invention according to claim 3, the outer axial openings are open to the outside in radial direction. This configuration is particularly advantageous if it is desired to prevent a high rise of temperature by an increased flow of lubricant through the bearing arrangement of the planet gear.

The outer axial openings of the stop washer are open to the outside in radial direction through a constriction. This assures that only a part of the lubricant can escape from the outer axial opening at any time.

At least the corners of the axial openings are rounded. This rounding can be realized, for example, by vibratory grinding, so that, in this way, a removal of the lubricant from the openings of the stop washer is facilitated.

The stop washer is made by punching. This manufacturing technology permits a particularly economic fabrication.

Finally, the stop washer is provided with a friction-reducing coating.

The invention will now be described more closely with reference to the following examples of embodiment.

DETAILED DESCRIPTION OF THE DRAWINGS

Figure 1:
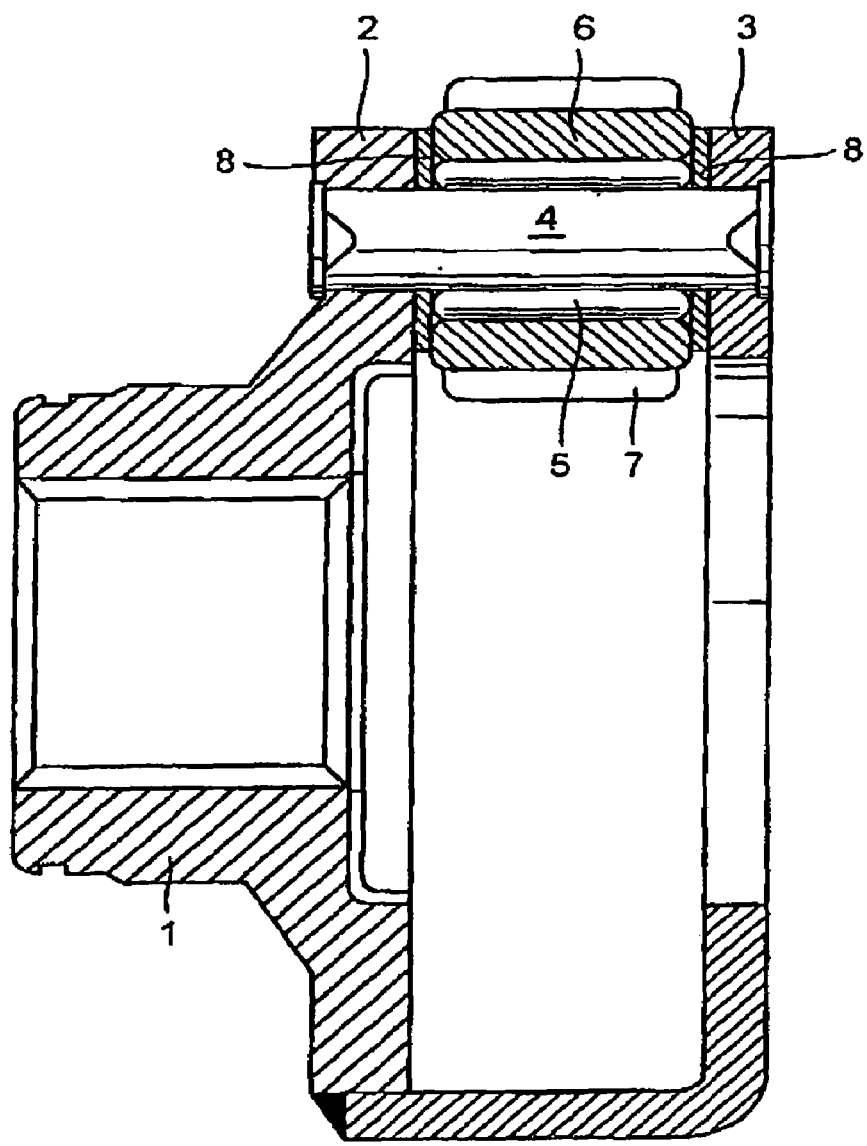
FIG. 1 is a longitudinal section through a planet gear carrier of the prior art.

The planet gear carrier 1 of the prior art shown in FIG. 1 comprises two side walls 2, 3 in which planet gear axles 4 are fixed. Planet gears 6 whose teeth 7 mesh with an annulus, not shown, and with a sun gear, also not shown, are mounted through bearing arrangements 5 for rotation on the planet gear axles 4. On both sides of the planet gears 6 are arranged on the planet gear axles 4, stop washers 8 that are generally made of a material having good sliding properties like, for example, bronze-plated sheet metal, and are thus intended to reduce friction between the planet gears 6 and the planet gear carrier 1.

Figure 2:
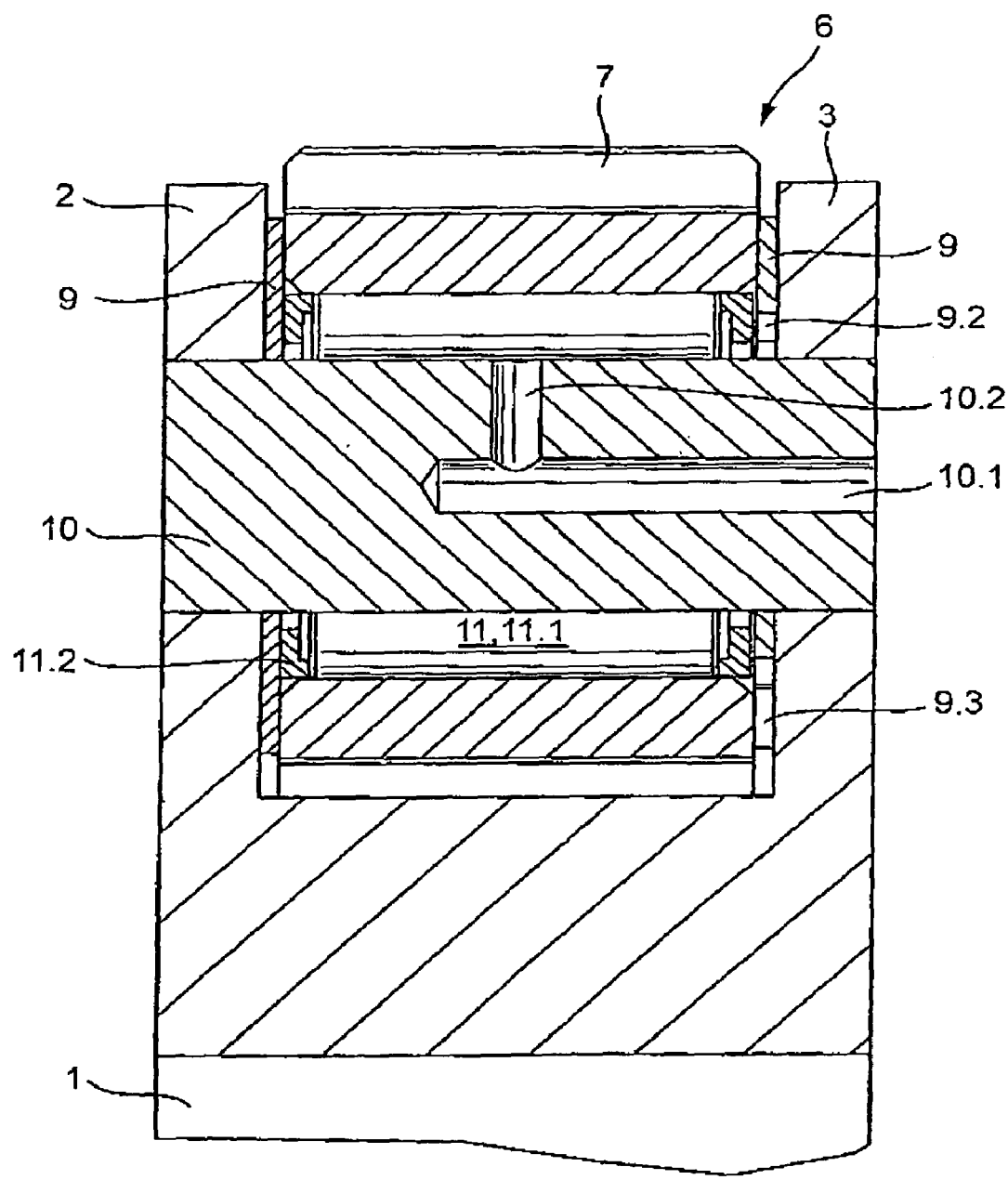
FIG. 2 is a longitudinal section through a planet gear bearing arrangement according to the invention.
Figure 3:
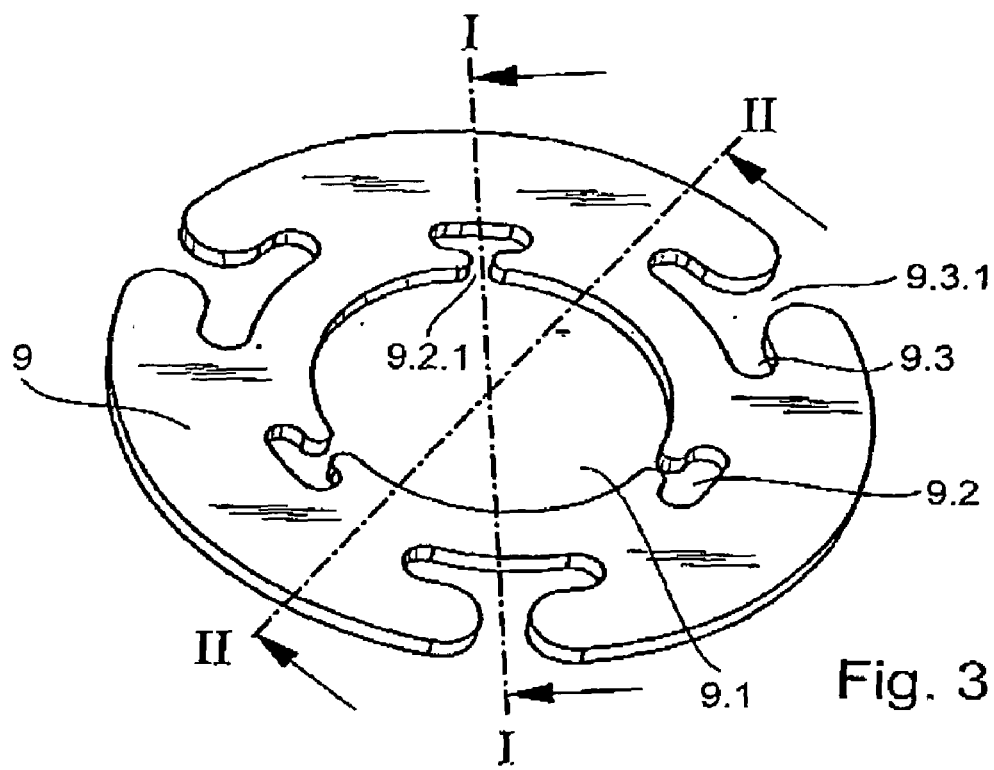
FIG. 3 is a perspective illustration of a stop washer according to the invention.
Figure 4:
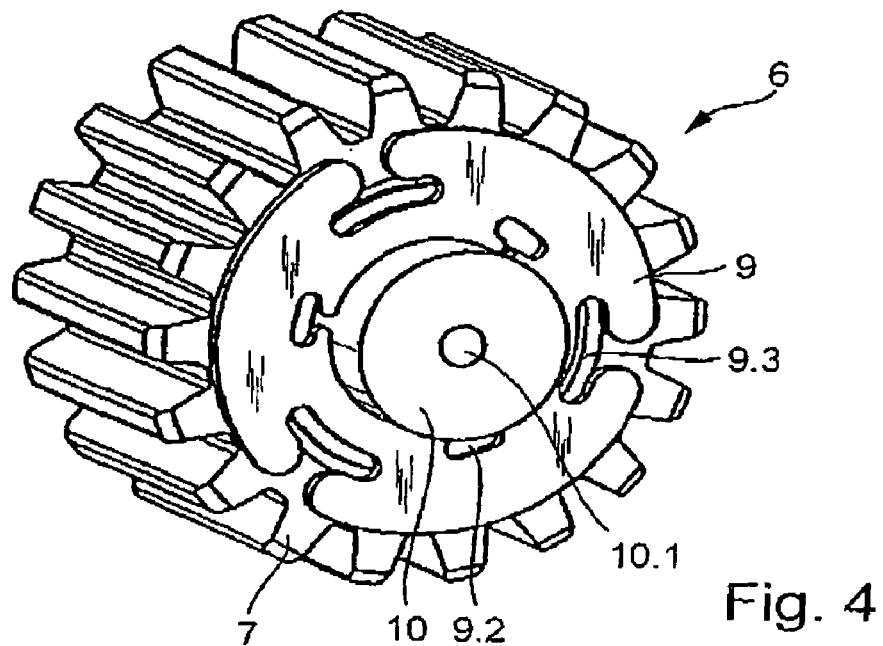
FIG. 4 is a perspective illustration of a planet gear and the stop washer according to the invention in assembled state.

The stop washers 9 of the invention illustrated in FIGS. 2, 3 and 4 are mounted with their reception bores 9.1 on the planet gear axles 10 on both sides of the planet gears 6. The planet gear axle 10 comprises an axial lubricant passage bore 10.1 and, branching off therefrom, a radial lubricant passage bore 10.2. The planet gear axle 10, in its turn, is anchored in the side walls 2 and 3 of the planet gear carrier 1. The planet gears 6 is mounted for rotation on the planet gear axle 10 through a needle roller crown ring 11 made up of bearing needle rollers 11.1 and a cage 11.2.

As shown further in FIGS. 2, 3 and 4, the stop washer 9 comprises, at three equally spaced peripheral points, inner axial openings 9.2 that communicate with the reception bore 9.1 through constrictions 9.2.1. Outer axial bores 9.3 that are open to the outside through constrictions 9.3.1 are arranged between the inner axial openings 9.2 while being offset radially outwards from these. The section through the stop washer 9 shown on the right in FIG. 2 is taken along line I—I while the section shown on the left extends along line II—II of FIG. 3. As shown further in the figures, the inner axial openings 9.2, as viewed in radial direction, are arranged in the region of the needle roller crown ring 11, while the outer axial openings 9.3 overlap at least a part of the end face of the planet gear 6. The position of the inner axial openings 9.2 relative to the position of the outer axial openings 9.3 can vary i.e., they can be arranged in successive order in radial direction or in overlapping relationship.

Lubricant penetrates at first through the axial lubricant passage bore 10.1 and the radial lubricant passage bore 10.2 of the planet gear axle 10 into the raceway region of the bearing needle rollers 11. From there, it is centrifuged outwards by radial forces and at first fills the inner radial openings 9.2 that thus act as lubricant reservoirs. With a gap existing between the planet gear 6 and the stop washer 9 and/or between the stop washer 9 and the side wall 2, 3, the lubricant then also penetrates into the outer axial openings 9.3 from which it can exit again through the constrictions 9.3.1. In this way, a continuous flow of lubricant through the bearing arrangement is guaranteed, so that the friction partners concerned are always separated from each other by a lubricant film.

Figure 5:
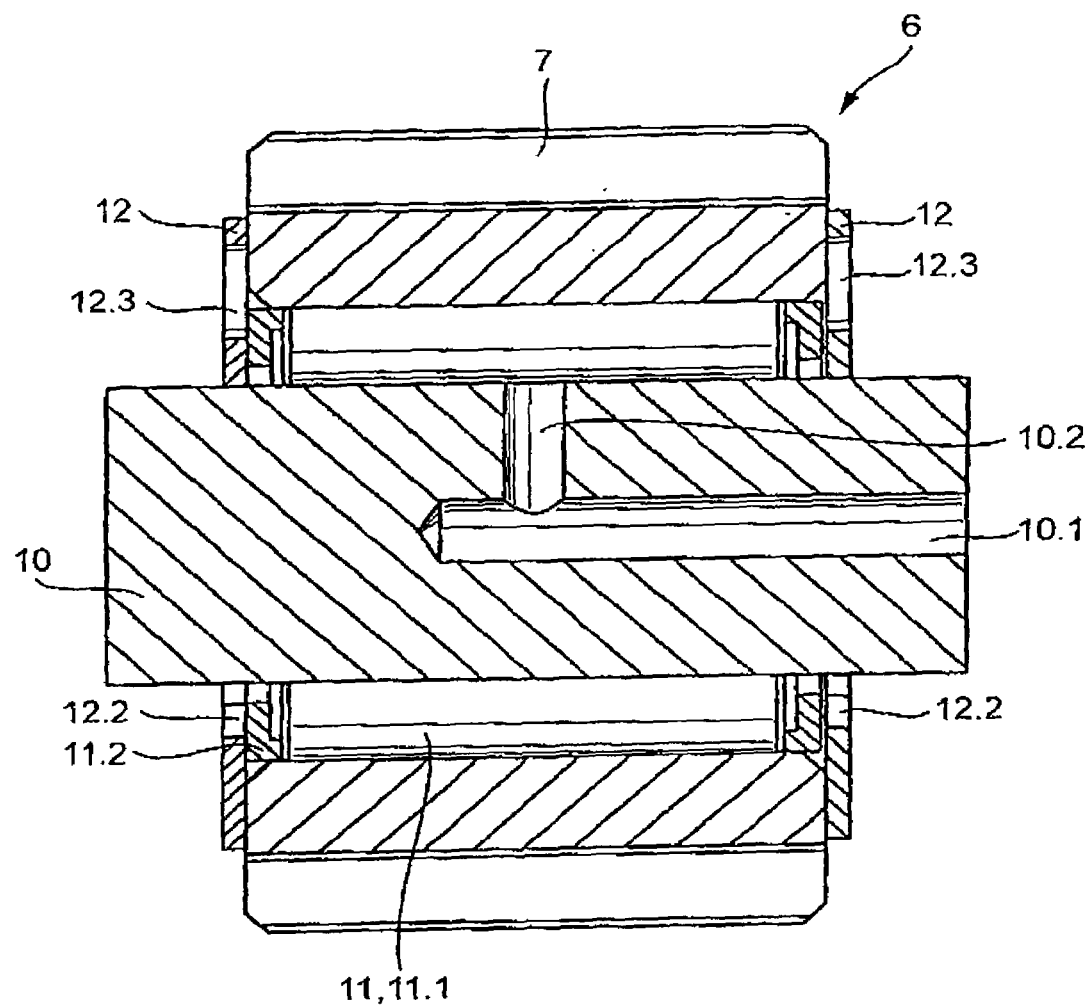
FIG. 5 is a longitudinal section through a further planet gear bearing arrangement according to the invention.
Figure 6:
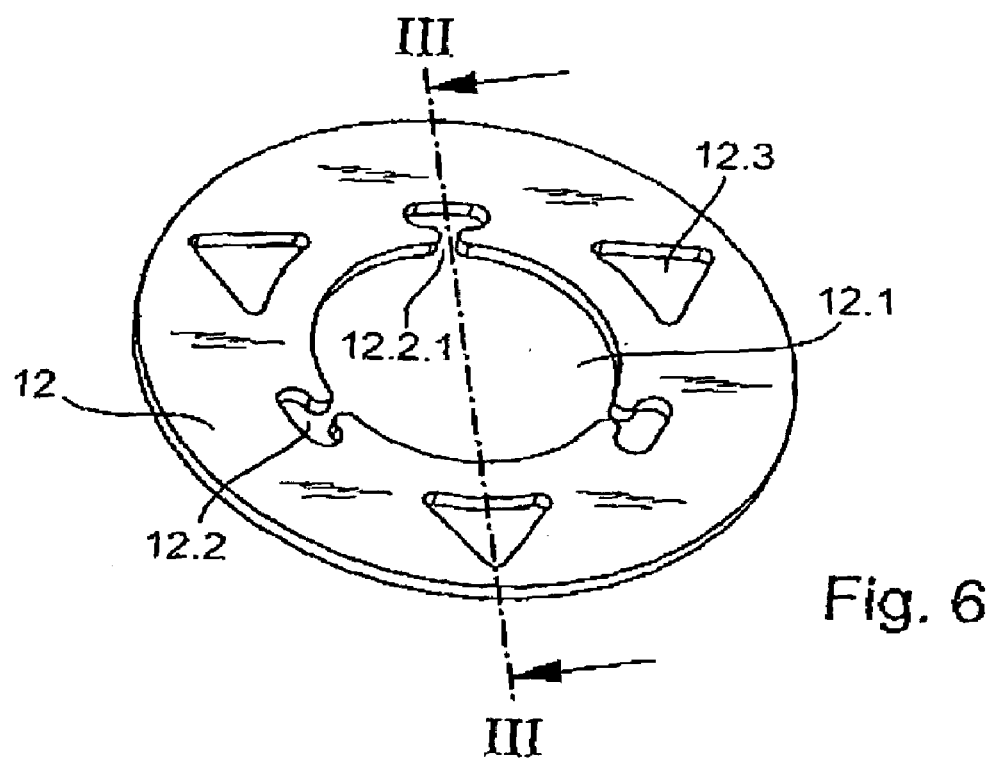
FIG. 6 is a perspective illustration of a further stop washer according to the invention.
Figure 7:
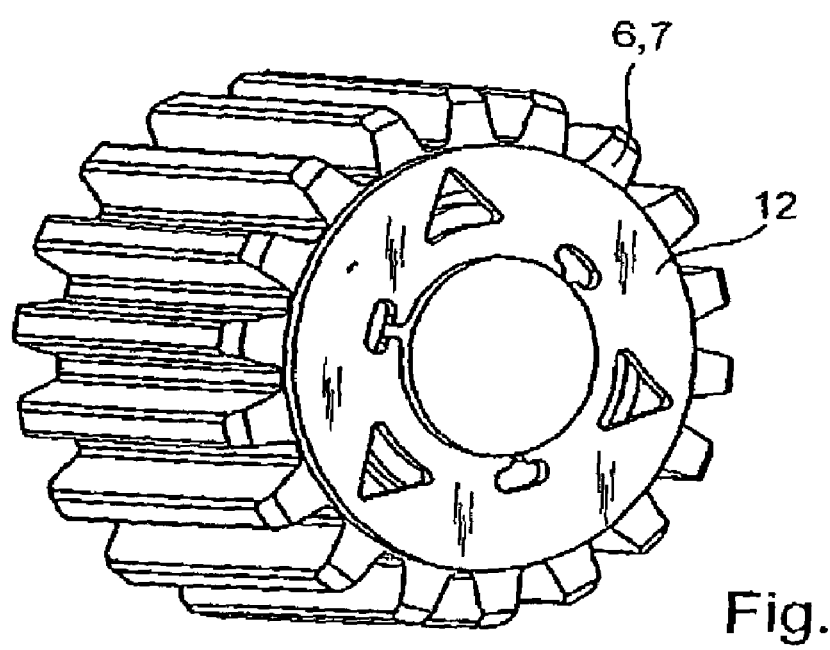
FIG. 7 is a perspective illustration of a planet gear and the further stop washer according to the invention in assembled state.

The stop washer 12 shown in FIGS. 5, 6 and 7 differs from the stop washer 9 of FIGS. 2, 3 and 4 only by the fact that the outer axial openings 12.3 are triangular in shape and not open to the outside. The sections of the two stop washers 12 arranged on the right and the left of the planet gear 6 shown in FIG. 5 are taken along line III—III of FIG. 6. In this embodiment, too, the arrangement of the inner axial openings 12.2 and the outer axial openings 12.3 can vary. They can be arranged in successive order as viewed in radial direction or may overlap each other. It has proved to be advantageous for the through-flow of lubricant if at least the corners of the axial openings 9.2, 9.3, 12.2 and 12.3 are rounded.

REFERENCE NUMERALS

1 Planet gear carrier
2 Side wall
3 Side wall
4 Planet gear axle
5 Bearing arrangement
6 Planet gears
7 Tooth
8 Stop washer
9 Stop washer
9.1 Reception bore
9.2 Inner axial openings
9.2.1 Constriction
9.3 Outer axial openings
9.3.1 Constriction
10 Planet gear axle
10.1 Axial lubricant passage bore
10.2 Radial lubricant passage bore
11 Needle roller crown ring
11.1 Bearing needles
11.2 Cage
12 Stop washer
12.1 Reception bore
12.2 Inner axial openings
12.2.1 Constriction
12.3 Outer axial openings

The invention claimed is:

1. A stop washer (9, 12) for planet gears of a planetary transmission, which stop washer (9, 12) is arranged with a reception bore (9.1, 12.1) on a planet gear axle (10) fixed in a planet gear carrier (1) and delimits said planet gears (6) in both axial directions, said planet gears (6) being mounted through a rolling bearing arrangement (11) for rotation about planet gear axles (10), a supply of lubricant to the bearing arrangement (11) being provided by an axial and a radial lubricant passage bores (10.1, 10.2) of the planet gear axle (10) and by inner and outer axial openings of the stop washer (9, 12), wherein each of the inner axial openings (9.2, 12.2) communicates through a constriction (9.2.1, 12.2.1) with the reception bore (9.1, 12.2) of the stop washer (9, 12), wherein the inner axial openings are arranged at least two equally spaced peripheral points of the stop washer (9, 12), and wherein the outer axial openings (9.3, 12.3) are arranged offset radially outwards between the inner axial openings (9.2, 12.2), as viewed in radial direction, the inner axial openings (9.2, 12.2) are situated in a region of rolling elements (11.1) of the bearing arrangement (11), while the outer axial openings ((0.3, 12.3) overlap at least a part of an end face of the planet gears (6).

2. A stop washer (12) according to claim 1, wherein a peripheral dimension of the outer axial openings (12.3) diminishes in radially outward direction.

3. A stop washer (9) according to claim 1, wherein the outer axial openings (9.3) are open to the outside in radial direction.

4. A stop washer (9) according to claim 1, wherein the outer axial openings (9.3) are open to the outside in radial direction through a constriction (9.3.1).

5. A stop washer (9, 12) according to claim 1, wherein corners of the axial openings (9.2, 9.3, 12.2, 12.3) are rounded.

6. A stop washer (9, 12) according to claim 1, wherein the stop washer is made out of sheet metal by punching.

7. A stop washer (9, 12) according to claim 1, wherein the stop washer is provided with a friction-reducing coating.

* * * * *